May 22, 1956     I. MILLER     2,746,991
PREPARATION OF MALEIC ACID
Filed Sept. 19, 1952
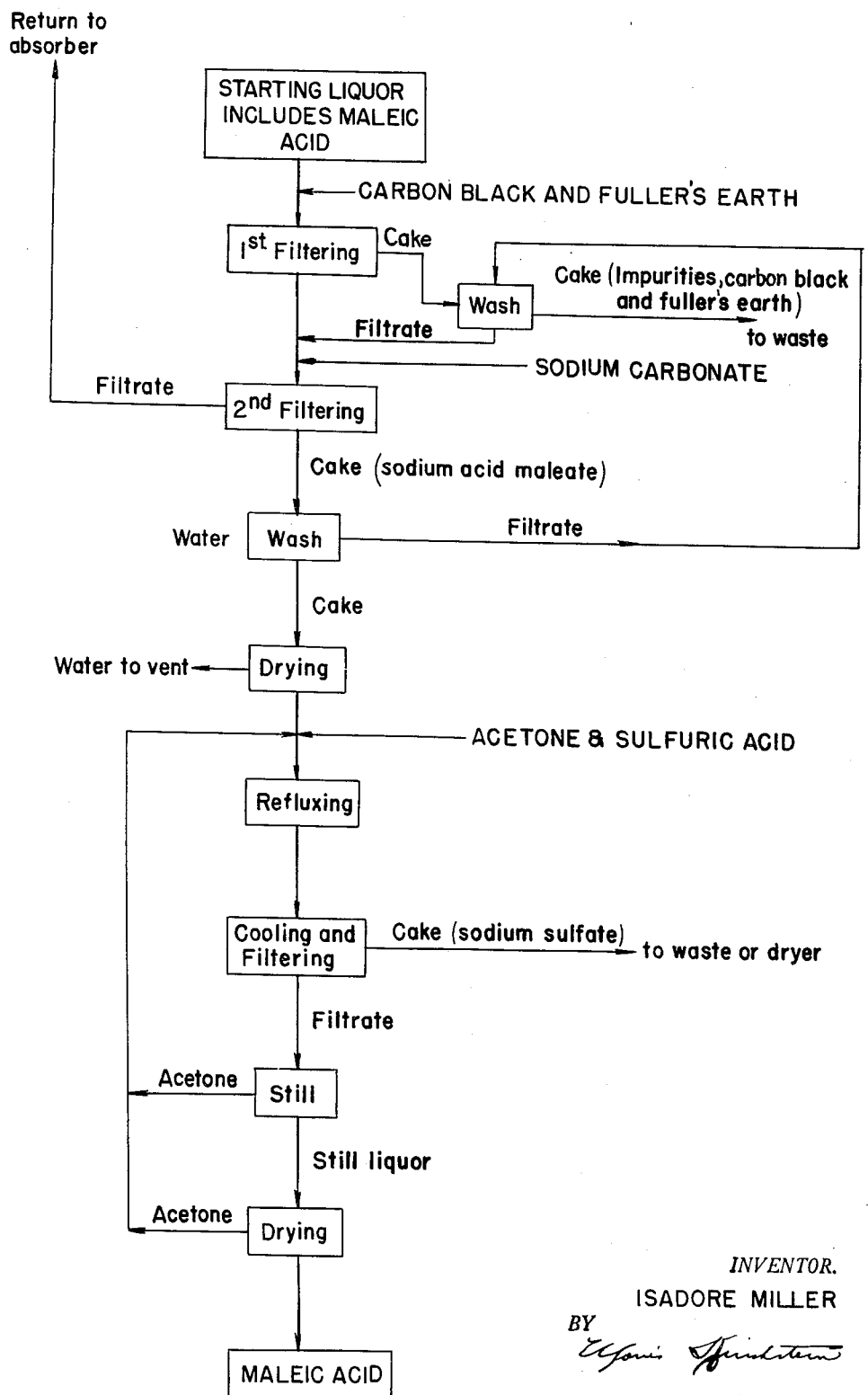
INVENTOR.
ISADORE MILLER
BY
ATTORNEY United States Patent Office 2,746,991
Patented May 22, 1956

2,746,991

PREPARATION OF MALEIC ACID

Isadore Miller, New York, N. Y.

Application September 19, 1952, Serial No. 310,376

1 Claim. (Cl. 260—537)

This invention relates to a process for the preparation of pure, water-soluble, solid organic acids from dilute aqueous solutions of the acids or their salts or from the dry salts (anhydrous or hydrated). In general it relates to the recovery of solid hydrated or anhydrous organic acids which must ordinarily be prepared from aqueous solutions or suspensions of their salts, said acids being just as soluble or even more soluble in water as in organic solvents so that direct extraction with water-immiscible solvents becomes uneconomical. More particularly it relates to the recovery of water-soluble, solid polybasic acids from dilute waste liquors. In its special application it relates to the recovery of pure maleic acid from waste liquors such as those obtained in the manufacture of either maleic or phthalic anhydrides.

In the manufacture of liquid organic acids which are very water-soluble or miscible with water in all proportions, as, e. g., acetic acid, it is common practice to recover a concentrated, or, eventually, pure anhydrous product from a dilute liquor by liquid-liquid extraction with a suitable water-immiscible liquid capable of forming an azeotropic mixture from which the various elements can be separated by proper fractionation. The same principle of selective solubility has also been applied to the recovery of solid polybasic, water-soluble acids; for example, it has been used in the preparation of aconitic acid which is obtained in the form of a mixed alkaline earth salt as a by-product in sugar manufacture by the treatment of the residual blackstrap molasses. In this and similar cases, however, it is necessary, for obvious reasons, to depress the solubility of the organic acid in water; with aconitic acid this is accomplished by extracting the free aconitic acid from a water solution of a mineral acid salt in the presence of a relatively high concentration of free mineral acid. Such a process is difficult and complicated.

In the manufacture of maleic and phthalic anhydrides by the vapor phase oxidation of benzene large amounts of maleic acid may be obtained as a by-product at the scrubber end of the process. This may be recovered as a 15–20% solution of maleic acid containing accumulated impurities such as quinones and the like. This liquor presents a serious disposal problem; aside from the question of economic waste, this liquor is exceedingly corrosive and cannot be handled in ordinary metal containers nor can it be allowed to become part of ordinary water drainage without neutralization.

Solutions of acids of this type can of course be concentrated by evaporation of water either with or without vacuum and the acid recovered by crystallization. Such a process is not only expensive (since it involves evaporation of relatively large amounts of water) but also necessitates employment of special materials of construction; for example, most grades of stainless steel equipment will not stand up under maleic acid and even wood is defibrinated by hot solutions of such liquors.

It is an object of the present invention to provide an economical process for the recovery of water-soluble, solid, organic acids from dilute aqueous liquors without either subjecting such liquors to heat or concentrating same by evaporation of water.

Another object of the present invention is to provide a simple means whereby the major portion of the acid values can be separated from the water by mechanical means.

It is a further object to provide a method whereby such acids can be prepared from a substantially non-aqueous, non-reactive medium which may also serve as a solvent from which a pure or anhydrous acid can readily be recovered by evaporation of the said solvent or by crystallization therefrom.

In a special application of the present invention it is an object to provide a new process for the recovery of pure maleic acid from waste liquors.

I have found that water-soluble, solid organic acids can be recovered from solution by partial neutralization of the solution with alkali or alkaline earth oxides, hydroxides or carbonates to form acid salts, that is, half salts, and the like, which are relatively insoluble in water, or, at any rate, are much less soluble in water than either the free acid, or, in the most cases, the corresponding neutral salts. Such acid salts have the additional advantage that they may be precipitated as hydrates of definite water composition. In this way the precipitated acid in the form of an acid salt can be separated from the bulk of the water at ordinary temperatures simply by filtration and without evaporation; in effect, this corresponds to a concentration of the acid and conversion to a solid phase wet with mother liquor only. A further advantage is that the residual liquor (that is, the mother liquor) has been so reduced in acid strength that it is no longer very corrosive, so that further handling of such liquor is facilitated as regards materials of construction.

It is to be noted, however, that those neutral salts which are sufficiently insoluble in water will serve the purposes of the instant invention.

In order to liberate the free acid from its salt and to obtain the same in a pure, anhydrous condition, the acid salt (preferably after drying or removal of combined water in the case of hydrated salts) is decomposed with a suitable mineral acid containing little or no water. The decomposition is carried out in the presence of a non-reactive organic solvent which is a good solvent for the free organic acid but in which both the acid salt as well as the alkali or alkaline earth salts of the given mineral acid are substantially insoluble. The amount of mineral acid used is limited to a value slightly less than, or exactly equal to, the stoichiometrical proportion of the mineral acid to the alkali or alkaline earth metal present in the original acid salt, so that the organic acid liberated will be free from even traces of mineral acid. As a result, the solution of the organic acid in the organic solvent obtained after filtering off the resultant insoluble mineral acid salt will consist essentially of a solution from which free organic acid can readily be recovered in a pure and substantially anhydrous state. The recovery is either by crystallization from or evaporation to dryness of the organic solvent.

In the same way dry or dissolved salts of solid organic acids can serve as a starting point from which to prepare the corresponding pure acid. The invention therefore includes a process for the preparation of pure organic, water-soluble solid acids by decomposition of salts in a non-aqueous non-reactive medium in which the said acids are soluble but in which the resulting by-product inorganic salts are insoluble.

I have found further that very little water need be present to effect decomposition of the organic salt by mineral acid. For example, in decomposing a dry salt the water content of concentrated sulfuric acid (93–95% $H_2SO_4$) is sufficient. In working with a wet salt the excess water present can be compensated for by proper choice of solvent so as to obtain a solvent mix from which substantially all the free water will be eliminated easily by evaporation with the solvent itself or by means of a readily formed azeotrope. In any event, to obtain anhydrous acid, the total water present must be less than the amount required to form a definite, known, hydrated compound.

The organic solvent must primarily be a good or active solvent for the organic acid; moreover, it must be inert, i. e., non-reactive, with respect to the latter or whichever salt thereof is employed. Ethers, ketones and chlorinated hydrocarbons are generally satisfactory. Since alcohols, glycols and the like usually react to form esters under anhydrous or dehydrating conditions, such solvents cannot be used. With any given acid, however, esters of that acid may be used provided that the free alcohols are substantially absent. In general, any active solvent which is either relatively insoluble in water or can be easily separated therefrom and which at the boil does not react with the organic acid, particularly in the presence of mineral acids or their salts, is a suitable medium. The choice of solvent will be determined in large measure by solvent-dissolving power and inertness with respect to the organic acid, boiling point and flammability; for example, for maleic acid I prefer to use acetone, for aconitic acid, methyl ethyl ketone. These solvents are inert to all the reacting substances and their products.

As regards mineral acids, the main problem is to control the amount of water to be present in the final product depending upon whether the final product is to be a specific hydrate or is to be anhydrous. In using an acid such as ordinary concentrated hydrochloric acid containing approximately 65 percent water, it is necessary to adjust the organic solvent so as to be able to control the disposition or the removal of this water at a proper point in the process without affecting the water content of the end product, if a hydrate is desired. Of course, if an anhydrous or substantially anhydrous product is to be obtained, the water must be removed until there is present less than the amount required to form a definite, known, hydrated compound. Acids such as nitric and phosphoric also can be used.

Since in commercial use it is important to lower the water content of the product (to obtain the desired hydrate or the anhydrous product) in the most efficient and inexpensive way, I prefer to use sulfuric acid for this purpose. This acid is not only the most inexpensive commercially in cost but also is easily obtainable in any desired strength up to 100 percent monohydrate, or even more, so that it will contain only negligible amounts of water, whereby no special provision need be made for elimination of water during the decomposition.

In adding the acid to the suspension of the organic salt in the solvent it should be borne in mind that heat may be generated; to avoid side reactions it is best to add the acid slowly, while stirring actively, and preferably with outside cooling so as to maintain the temperature low enough to prevent side reactions or undesired decomposition. After all of the acid has been added, the temperature may be raised even to the boiling point of the solvent, if desired, to obtain maximum solubility of the free organic acid in the solvent; since there is no free mineral acid present, the mass consists essentially of a suspension of mineral acid salt in a solution of the organic acid in an organic solvent.

The amount of mineral acid to be used should be so chosen as to obtain a neutral inorganic salt free from excess mineral acid. In the case of salts such as sodium sulfate which can form hydrates with water the by-product sodium sulfate obtained will be anhydrous if less than one mole of water is present in the mass per mole neutral sulfate.

There is set forth below one specific example of a process embodying my invention and as specifically applied to the recovery of maleic acid. It will be understood, however, that this example has been given only by way of illustration and is not to be considered as limitative. In the following example, certain values have been given for the various compounds and reaction products. It is to be understood, however, that these values have been made specific only for the purpose of simplicity and that the same are approximate and will vary with changing conditions.

*Example*

To a 1000 parts (exclusive of suspended solid impurities of which there are 28 parts by weight) of a mother liquor hereinafter referred to as mother liquor A which contains 17% maleic acid, 5 parts of a fifty-fifty purifying mixture of decolorizing black and fuller's earth is added in order to eliminate said solid impurities. The liquor is stirred as the mixture is added, this step taking place at room temperature. The liquor then is filtered. The filter cake, which contains the 28 parts of solid impurities, the 5 parts of the purifying mixture and 67 parts of mother liquor A (containing 12 parts of maleic acid), is washed with a liquor hereinafter referred to as mother liquor C taken from a later part of the process and containing 67 parts water and 67 parts of a mother liquor hereinafter referred to as mother liquor B produced after the step of adding sodium carbonate; said mother liquor C contains 6 parts of sodium acid maleate. The cake remaining after this washing contains 67 parts of mother liquor C (inclusive of 3 parts sodium acid maleate), 5 parts of purifying mixture and 28 parts solid impurities; it is discarded.

The filtrate obtained after treatment for removal of solid impurities comprises 933 parts of mother liquor A and is combined with the wash liquor obtained from treatment of the first filter cake with mother liquor C; said wash liquor contains 67 parts of mother liquor A (inclusive of 12 parts of maleic acid) and 67 parts of mother liquor C (inclusive of 3 parts of sodium acid maleate).

The combined filtrate which contains 1000 parts of mother liquor A and 67 parts of mother liquor C (inclusive of 170 parts of maleic acid and 3 parts of sodium acid maleate) is treated with 81 parts of sodium carbonate and the precipitate is separated out by filtration. 1000 parts of the resultant mother liquor B, which is saturated with 4% sodium acid maleate is returned to the process from which the mother liquor A is a product. The precipitate, containing 163 parts sodium acid maleate and 67 parts of mother liquor B, is washed with 134 parts of water. The remaining cake contains 157 parts of sodium acid maleate and 67 parts of water. The filtrate from this washing is mother liquor C.

The aforesaid remaining cake is placed in a dryer where the 67 parts of water is evaporated and vented. The sodium acid maleate, left after drying, is suspended, i. e. dispersed, in 350 parts of acetone and 60 parts of 95% sulfuric acid, and the mixture is refluxed until the reaction is substantially complete. The reaction products and acetone are cooled and filtered; the filter cake, containing 60 parts of sodium sulfate, 20 parts of acetone and 6 parts of maleic acid is either discarded or returned to the dryer. The filtrate, containing 125 parts of maleic acid and 330 parts of acetone, is placed in a still where most of the acetone, 290 parts, is distilled and returned to the suspension step. The still liquor, containing 125 parts of maleic acid and 40 parts of acetone, is passed to a dryer from which the remaining acetone is returned to the suspension step.

The product remaining after drying is 125 parts of maleic acid, representing a 92% recovery of the maleic acid, 33 parts of the original 170 parts having been returned to the source of mother liquor in the form of sodium acid maleate.

The flow sheet accompanying this specification schematically illustrates the foregoing example and therefore is likewise not to be taken as limitative.

It thus will be seen that I have provided a process which achieves the several objects of my invention and is well adapted to meet the conditions of practical use.

As various possible embodiments might be made of the above invention, and as various changes might be made in the embodiment above set forth, it is to be understood that all matter herein described is to be interpreted as illustrative and not in a limiting sense.

Having thus described the invention, there is claimed as new and desired to be secured by Letters Patent:

A process for the preparation of pure, substantially anhydrous, water-soluble, solid maleic acid from dilute aqueous solutions of said acid, said process including the steps of reacting the solution with sodium carbonate to produce sodium acid maleate, mechanically separating out said sodium acid maleate which is a water-insoluble salt, suspending said sodium acid maleate in acetone in which the sodium acid maleate is relatively insoluble, then converting said sodium acid maleate to maleic acid by reacting the same with concentrated sulfuric acid, said maleic acid being soluble in the acetone, said acetone being ineffective to dissolve any salts produced by reaction of the concentrated sulfuric acid and the sodium acid maleate and being inert to all compounds present in the process, mechanically separating out the resultant insoluble sodium sulfate, and then recovering the maleic acid from the acetone.

References Cited in the file of this patent

UNITED STATES PATENTS

| | | |
|---|---|---|
| 1,945,246 | Witzel | Jan. 30, 1934 |
| 2,453,588 | Polly | Nov. 9, 1948 |
| 2,494,049 | Levin | Jan. 10, 1950 |
| 2,572,018 | Evans | Oct. 23, 1951 |